Sept. 9, 1924.
J. P. TEMPLEMAN ET AL
1,507,695
AUTOMOBILE TESTING AND REPAIR DEVICE
Filed Nov. 12, 1921   3 Sheets-Sheet 1
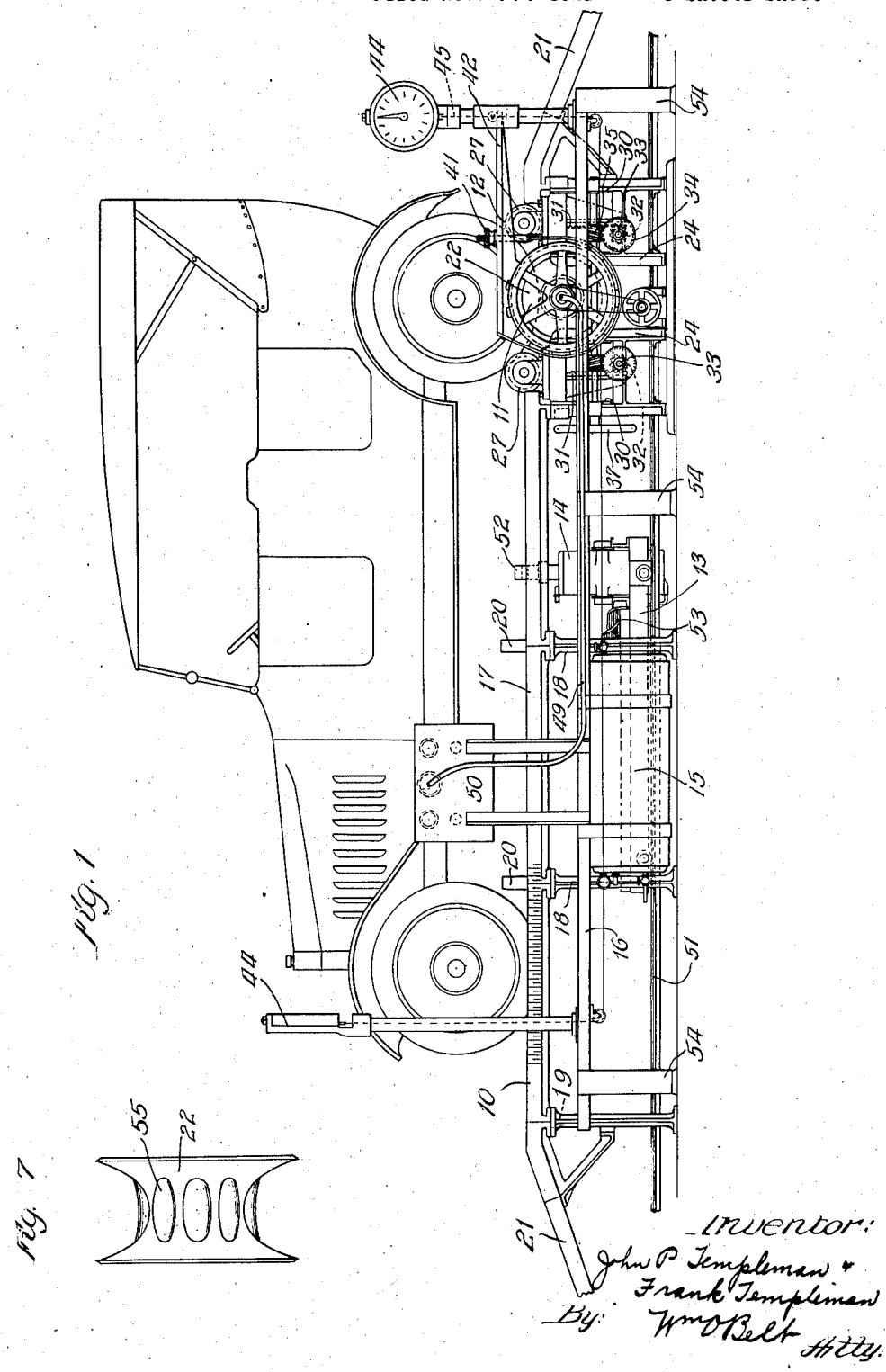

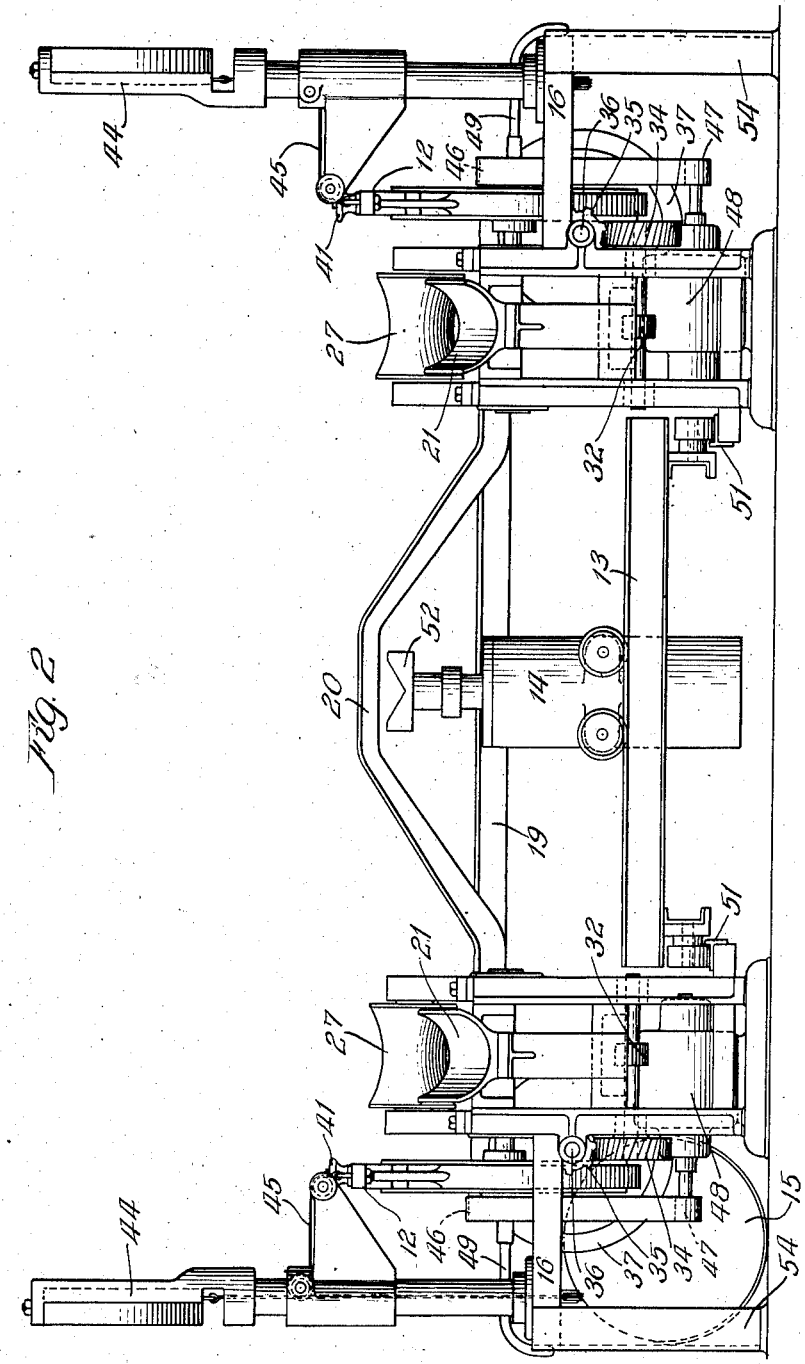

Sept. 9, 1924.
J. P. TEMPLEMAN ET AL
AUTOMOBILE TESTING AND REPAIR DEVICE
Filed Nov. 12, 1921
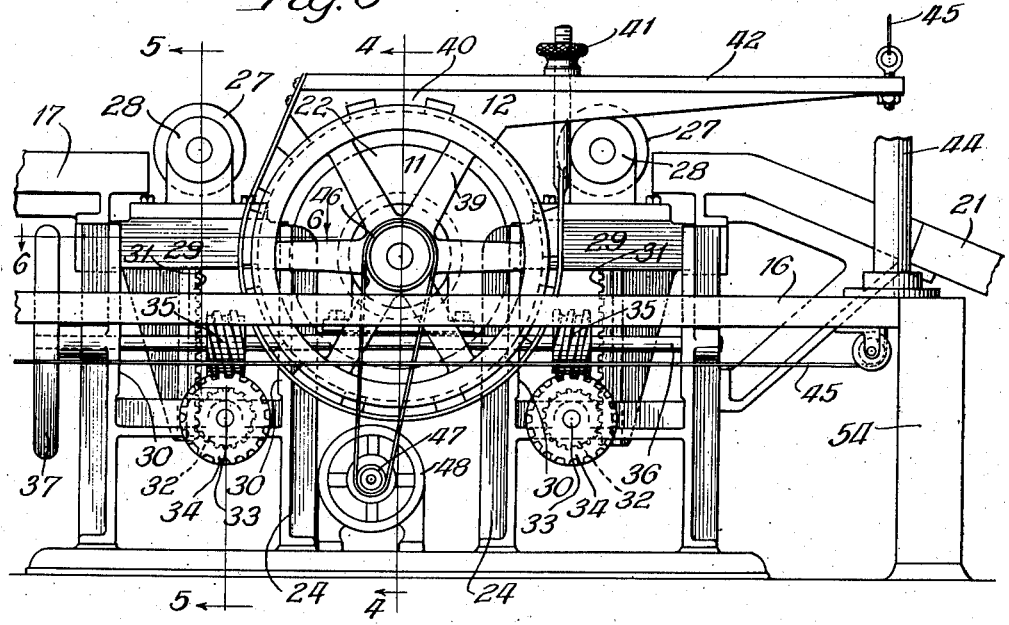
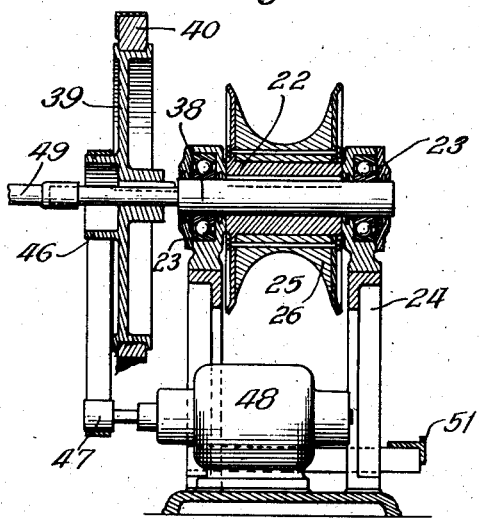
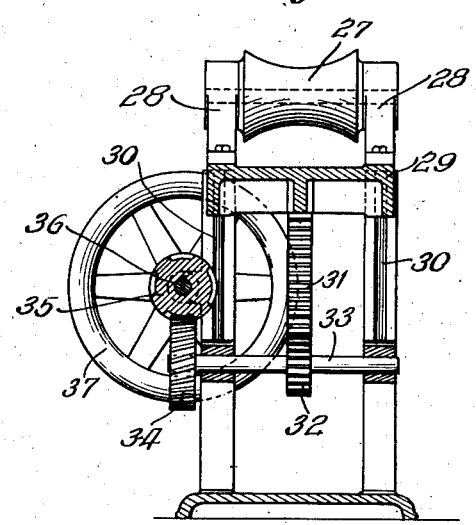
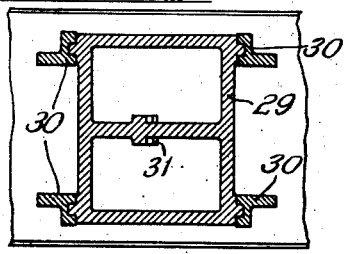

Patented Sept. 9, 1924.

1,507,695

UNITED STATES PATENT OFFICE.

JOHN P. TEMPLEMAN AND FRANK TEMPLEMAN, OF CHICAGO, ILLINOIS.

AUTOMOBILE TESTING AND REPAIR DEVICE.

Application filed November 12, 1921. Serial No. 514,512.

*To all whom it may concern:*

Be it known that we, JOHN P. TEMPLEMAN and FRANK TEMPLEMAN, citizens of the United States, residing at Chicago, in the county of Cook and State of Illinois, have invented certain new and useful Improvements in Automobile Testing and Repairing Devices, of which the following is a specification.

This invention relates to the care and maintenance of automobiles and has for its principal object to thoroughly test and accurately adjust the propelling and braking mechanism, to facilitate the location of trouble throughout the machine, and to generally expedite the work of repair, care and maintenance.

More specific objects are to ascertain the actual horse power developed by the motor and the causes for any deficiency, to determine the torque delivered to each driving wheel, the brake resistance applied to each drum, the alignment of the wheels, and the functioning of the various other parts of an automobile.

Another object of the invention is to simulate the conditions of road service with the automobile at rest.

Another object of the invention is to assemble various new and old tools and appliances useful to the garageman in convenient and co-operative relation.

Further objects and advantages of the invention will become apparent as the description is read in connection with the accompanying drawing illustrating a selected embodiment of the invention, in which—

Fig. 1 illustrates a side elevation of this embodiment with an automobile thereon;

Fig. 2 is an elevation looking at the right end of Fig. 1; and.

Fig. 3 is an enlarged detail of the rear portion of Fig. 1;

Fig. 4 is a transverse section on the line 4—4 of Fig. 3;

Fig. 5 is a transverse section on the line 5—5 of Fig. 3;

Fig. 6 is a longitudinal section on the line 6—6 of Fig. 3; and

Fig. 7 is an elevation of one of the rollers adapted to drive or be driven by the rear wheels.

The general layout of the invention here illustrated includes a runway 10, a treadmill 11 adjacent to one end of the runway and equipped with Prony brakes 12, a trundle 13 operating beneath the runway, and provided with the jack 14, an air tank 15 and side platforms 16.

The runway 10 may be constructed in any suitable manner, and is here illustrated, as including the grooved rails 17 carried by the columns 18 which are braced by cross members 19 and 20, the latter being arched as indicated in Fig. 2 to afford clearance for the movements of the jack 14. Suitable approaches 21 are provided at each end to facilitate the movements of the automobile onto and off from the runway. The rails 17 are preferably graduated in inches and suitably numbered so as to facilitate the alignment of the wheels. It will be obvious that this runway may be made of any suitable length and height, and may be constructed in any convenient manner.

Adjacent to the rear end of the runway, the rails 17 are cut away and a pair of rollers 22 are suitably mounted as on roller bearings 23 carried by the uprights 24, and are arranged in alignment with the rails 17. Preferably, the contact surfaces of these rollers are concave, as indicated at 25, to provide proper engagement with the tires of the driving wheel. Preferably the body portions 26 of these rollers are made of wood, detachably secured in place so that they may be readily replaced when worn or damaged. In order to retain the driving wheels in proper relation to the rollers 22, we provide a pair of idlers 27 for each roller, one in front, and one in the rear thereof, and mount them adjustably so that they may be lowered to permit the vehicle to drive on the runway, and afterwards raised to retain the driving wheels in proper position. Preferably, these rollers are equipped with axles journaled in suitable bearings 28 carried by the frame 29 held between guides 30 and moved up and down by racks 31 driven by pinions 32 on the shafts 33 rotated by worm wheels 34 meshing with worms 35 on the shafts 36 equipped with hand wheels 37. By this arrangement the rollers 27 are very easily lowered until they are aligned with the upper surface of the rollers 22, so that an automobile may easily be driven into position on the runway, and then by rotating hand wheels 37 in the opposite direction, the rollers 27 may be elevated until they assume the proper relation to the driving wheels.

The rollers 22 are keyed to shafts 38 which carry drums 39 forming a part of the Prony brakes 12 which include the friction bands 40 controlled by the nuts 41 and connected with the levers 42 which are, in turn, connected to the indicators 44 by cables 45. We preferably use four indicators located conveniently adjacent to the machine and one at each side thereof at the front, and at the rear, as shown. Each of the drums 39 is equipped with a pulley 46 aligned with a similar pulley 47 on the shaft of a motor 48 suitably mounted beneath the runway. Each shaft 38 is equipped with a section of flexible shaft 49 leading to a suitable tachometer here shown as conveniently mounted on an instrument board 50, but which may be located in any suitable place so that the readings of the two instruments can be readily compared to determine any difference in the speed of rotation of the driving wheels.

The instrument board 50, is here shown supported adjacent to the front end of the runway, and is intended to carry a variety of instruments such as volt meters and all that sort of equipment used by auto mechanics in their work. The exact location of this board is a matter of choice, and it is sufficient for the purpose of this invention that it be of suitable size to carry all the necessary instruments and be conveniently located either in fixed relation to the runway, or movable relative thereto.

The trundle 13 is carried by stationary rails 51 secured to the uprights 18, or supported in any other manner, and is arranged to traverse the entire length of the runway so as to be located beneath any portion of an automobile supported on the runway. The particular construction of this trundle is a matter of choice, but we prefer to equip it at one end with a suitable jack 14 mounted so as to be movable transversely to the trundle, to place the lifting head 52 under any part of the automobile. The jack may be of any suitable construction, but is here shown as being air-operated, and a convenient length of hose 53 is supplied for connecting it with the air tank 15. Other hose may be supplied for conveying compressed air to various parts of the automobile, or one hose alone may be used, as individuals may prefer. As illustrated, the air tank is conveniently located beneath one of the platforms 16, and it is obvious that a plurality of tanks may be used instead of one.

We have shown the platforms as being supported partly on the uprights of the runway, and partly by columns 54 at a height slightly below the rails 17, but of course, this may be varied to suit particular conditions and the preference of individuals.

The rollers 22 and 27 constitute a sort of treadmill permitting the driving wheels to be operated at all speeds within the range of the automobile while the machine is stationary on the runway. By equipping the rollers 22 with the Prony brakes it is possible to accurately determine the horse power developed by the motor and the power obtained by the use of various selective gears of the transmission. Obviously, either one or both of the rollers 22 may be used in these tests.

The presence of the tachometers connected with the shafts 38 make it possible to determine any differential between the two driving wheels and thereby assist in the location of any improper adjustment of the brakes, or in any other condition tending to make one wheel drive faster than the other. This is a very important use of the invention, for at the present time, so far as we are informed, it is practically impossible to accurately test the brakes so that the two driving wheels will be equally retarded.

By equipping roller 22 with a plurality of projections 55 (Fig. 7), the automobile may be given the up and down movements produced by the inequalities in the road and thereby facilitate the location of noises and rattles, as well as other conditions that occur only in the ordinary operation of the car.

The provision of the motors 48 makes it possible to drive the gasoline motor in the automobile at speeds corresponding to the speeds used in service, and thereby aid in locating a variety of motor troubles without the annoyance of dealing with the hot motor. In addition, a great variety of other advantages will be obvious to those skilled in the art.

The use of four indicators 44 arranged as illustrated makes it possible to read the horse power indicated from a variety of positions. The indicators at the front are particularly advantageous, in permitting the operator of the car, who may be the owner or the chauffeur to observe the horse power developed by the motor under his particular manner of operation.

The trundle 13 may be used in the same manner as the trundles commonly found in garages, and in a variety of other ways. As illustrated, the chassis is sufficiently high above the trundle to give a workman more latitude of movement than when the ordinary trundle is used on the floor beneath the automobile. The particular arrangement of this trundle with respect to the rails 17 is subject to individual preference, but that shown has been found to be very advantageous in service.

The presence of a tank, or tanks, of compressed air under the platforms provides a very convenient source of air for all the various uses to which it is put in the up-to-date shop. The location of the tanks beneath the platform places these bulky articles out of the way, and the particular position illustrated requires a minimum quantity of hose.

While we have shown and particularly described rollers 22 and 27, it will be clear that the great variety of treadmill constructions can be readily adapted to our purposes. Under ordinary conditions the rollers illustrated will be found more suitable than the endless belt or step-type of treadmill.

We claim:

1. In a device of the character described, means to support an automobile, friction devices for engagement with each of the driving wheels of the automobile, a power testing device connected with each of said friction devices, and indicators connected with each of said testing devices.

2. The combination of a runway consisting of elevated rails, friction rollers aligned with the rails and adapted to support the respective driving wheels of an automobile, Prony brakes connected with the respective friction rollers, and indicators connected with the Prony brakes.

3. The combination of a runway adapted to receive an automobile, separate means adapted to be driven by each driving wheel of an automobile mounted on said runway, and a tachometer connected with each of said means.

4. The combination of a runway adapted to receive an automobile, a friction roller adapted to support a driving wheel of said automobile, means engaging said driving wheel to retain it on said friction roller, and means for bringing said last mentioned means into and out of operative position with respect to said driving wheel.

5. The combination of a runway, a roller adapted to be engaged with a driving wheel of an automobile on said runway, an idler adapted to have free rolling contact with said driving wheel to maintain it in engagement with said roller, and means for bringing said idler into and out of operative position with respect to said driving wheel.

6. The combination of a roller adapted to be driven by a driving wheel, a pair of idlers adjacent to said roller and adapted to have free rolling contact with said wheel, and means for adjusting said idlers relative to said roller to bring them into and out of operative positions with respect to said driving wheel, including means adapted to retain said idlers in adjusted position.

7. The combination of a runway, a friction device associated with said runway and adapted to engage a driving wheel of an automobile mounted on said runway, means to drive said friction device, and means engaging the wheel to hold it in operative position with respect to the friction device.

8. The combination of a runway including a pair of rails, friction rollers aligned with said rails, idlers adjustably mounted with respect to said friction rollers, and means for driving said friction rollers.

9. In an automobile testing and repair device, the combination of a runway adapted to receive the wheels of an automobile, a power testing device adjacent to one end of the runway and a power indicating device adjacent to the opposite end of the runway and operatively connected with said power testing device.

10. In an automobile testing and repair device, the combination of a runway adapted to support an automobile, power testing devices associated with said runway and adapted to cooperate with the driving wheels of said automobile, and power indicating devices associated with said runway adjacent to the front of said automobile and operatively connected with said power testing devices.

11. In an automobile testing and repair device, a roller having a groove extending circumferentially about its periphery adapted to receive a driving wheel of an automobile, and a plurality of transverse projections extending across said groove.

12. In an automobile testing and repair device, the combination of a runway, a roller aligned with said runway and having a groove extending circumferentially about its periphery provided with a plurality of transverse projections extending across said groove, grooved idlers aligned with said roller and adapted to cooperate with a driving wheel to hold it in engagement with said roller.

13. The combination of a runway adapted to support an automobile, power testing devices associated with said runway adjacent to one end thereof, tachometer means connected with said power testing devices, indicators associated with said runway and adapted to indicate the power determined by the power testing devices, and an instrument board adjacent to said runway adapted to support testing instruments.

14. In an automobile testing and repair device, the combination of a runway adapted to receive an automobile, tread mill devices associated with said runway adjacent to one end thereof, a track running lengthwise from said runway, a trundle mounted on said track and a jack carried by said trundle and movable transversely to said track.

15. In an automobile testing and repair device, the combination of a runway including spaced tracks adapted to receive the wheels of an automobile, rollers interposed between the ends of said tracks and adapted to receive the driving wheels of an automobile, idlers adapted to engage the driving wheels of an automobile at the front and the rear respectively of said rollers, and means for raising and lowering said idlers.

16. In an automobile testing and repair device, the combination of rollers adapted to receive and support the driving wheels of an automobile, idlers located at the front and the rear of said wheels, and means for moving said idlers into and out of engagement with wheels resting on said rollers.

17. The combination of a roller adapted to be driven by a driving wheel of an automobile, a pair of idlers adjacent to said roller, and means for adjusting said idlers relative to said roller including self-locking gearing.

18. The combination of a roller adapted to be driven by a driving wheel of an automobile, an idler adjacent to said roller means for adjusting the position of said idler including worm gearing, and means for operating said gearing.

19. In a device of the character described, means to support an automobile, friction devices for engagement with each of the driving wheels of the automobile, power testing devices connected with each of said friction devices, and indicators connected with said power testing devices to indicate the horse power and speed of rotation of said driving wheels.

20. In a device of the character described, means to support an automobile, friction devices for engagement with each of the driving wheels of the automobile, a power testing device connected with each of said friction devices, indicators connected with each of said testing devices, and a motor adapted to drive one of said friction devices.

JOHN P. TEMPLEMAN.
FRANK TEMPLEMAN.